United States Patent [19]

Dorai

[11] Patent Number: 5,684,179
[45] Date of Patent: Nov. 4, 1997

[54] METHOD FOR RECOVERING DIACETATE ESTERS OF POLYTETRAMETHYLENE ETHERS

[75] Inventor: Suriyanarayan Dorai, Missouri City, Tex.

[73] Assignee: E. I. du Pont de Nemours and Company, Wilmington, Del.

[21] Appl. No.: 572,598

[22] Filed: Dec. 14, 1995

[51] Int. Cl.⁶ .............................. C07C 67/48; C07C 67/24
[52] U.S. Cl. ..................... 560/191; 560/198; 560/200; 560/240
[58] Field of Search ..................... 560/191, 198, 560/200, 240

[56] References Cited

U.S. PATENT DOCUMENTS

| | | | |
|---|---|---|---|
| 4,120,903 | 10/1978 | Pruckmayr et al. | 260/615 |
| 4,163,115 | 7/1979 | Heinsohn et al. | 560/240 |
| 4,167,115 | 9/1979 | Stoever | 73/194 |
| 4,460,796 | 7/1984 | Mueller | 568/617 |
| 4,584,414 | 4/1986 | Pruckmayr | 568/617 |
| 5,118,869 | 6/1992 | Dorai et al. | 568/617 |
| 5,130,470 | 7/1992 | Dorai et al. | 560/200 |
| 5,149,862 | 9/1992 | Dorai et al. | 560/240 |

Primary Examiner—José G. Dees
Assistant Examiner—Rosalynd A. Williams

[57] ABSTRACT

An improved method for recovering purified diesters of polytetramethylene ethers involving the polymerization of tetrahydrofuran (THF) optionally with one or more comonomers (e.g., 3-methyl THF, ethylene oxide, propylene oxide, or the like) utilizing a solid acid catalyst (e.g., Nafion®) and a carboxylic acid with carboxylic acid anhydride (e.g., acetic acid with acetic anhydride) as molecular weight control agents wherein after polymerization product recovery involves bulk flashing of unreacted THF and stripping of remaining THF, carboxylic acid and carboxylic acid anhydride (e.g., acetic acid and acetic anhydride) by use of superheated THF. Such a process is useful in producing high purity commercial grade PTMEA that advantageously avoids problems associated with the presence of high boilers when converting to PTMEG.

4 Claims, 1 Drawing Sheet

METHOD FOR RECOVERING DIACETATE ESTERS OF POLYTETRAMETHYLENE ETHERS

BACKGROUND OF THE INVENTION

1. Field of the Invention

The present invention relates to an improved method of recovering purified diesters of polytetramethylene ethers. More specifically but not by way of limitation, the invention relates to the polymerization of tetrahydrofuran (THF) with or without a second cyclic ether comonomer utilizing a solid acid catalyst and carboxylic acid with carboxylic acid anhydride as molecular weight control agents wherein after polymerization product recovery involves bulk flashing of unreacted THF and stripping of remaining THF, carboxylic acid and carboxylic acid anhydride by use of superheated THF.

2. Description of the Related Art

Polytetramethylene ether glycol (PTMEG) is a commodity in the chemical industry which is widely used to form segmented copolymers with poly-functional urethanes and polyesters. PTMEG is commercially prepared by reacting tetrahydrofuran (THF) with fluorosulfonic acid and then quenching the product with water. While this process has proved to be quite satisfactory, it is not as efficient as desired because the acid cannot be recovered and reused. Moreover, disposal of the spent acid is a problem because of its toxicity and corrosiveness.

U.S. Pat. No. 4,120,903, discloses the polymerization of THF using a polymer containing alpha-fluorosulfonic acid groups as a catalyst and water or 1,4-butane diol as a chain terminator. The nature of the catalyst permits its reuse, thereby eliminating the disposal problems and the catalyst's lack of solubility in the reaction mass makes it easy to separate the catalyst from the product at the end of the polymerization reaction. This very low solubility also minimizes loss of catalyst as the reaction proceeds. However, this process produces a polytetramethylene ether glycol having a molecular weight of 10,000 or more, while the commercial products generally have molecular weights of less than 4,000 with the majority of commercial products having a number average molecular weight from 650 to 3,000.

U.S. Pat. No. 4,163,115 discloses the polymerization of THF and/or THF with comonomers to polytetramethylene ether diester using a fluorinated resin catalyst containing sulfonic acid groups, in which the molecular weight is regulated by addition of an acylium ion precursor to the reaction medium. The patent discloses the use of acetic anhydride and acetic acid being used with the solid acid catalyst. The polymeric product is isolated by stripping off the unreacted THF and acetic acid/acetic anhydride for recycle. The product isolated is the diacetate of polymerized tetrahydrofuran (PTMEA) which must be converted to the corresponding dihydroxy product, polytetramethylene ether glycol (PTMEG), to find application as a raw material in most urethane end use applications.

U.S. Pat. No. 5,149,862 discloses a process for polymerizing THF to produce PTMEA using a zirconium based catalyst. The molecular weight optionally may be controlled by the addition of acetic acid and acetic anhydride. The unreacted THF, acetic acid and acetic anhydride are removed by distillation or stripping the reaction mass with steam or an inert gas such as nitrogen. However, steam stripping requires temperatures which lead to degradation of the polymer while extensive unit operations are required to further separate water from the polymer, and stripping with an inert gas requires long processing times and/or impractical amounts of $N_2$.

The effect of residual acetic acid and acetic anhydride in PTMEA is harmful in several ways. If CaO is used as a catalyst in the subsequent transesterification reaction, acetic acid produces calcium acetate which tends to gel the transesterification reaction medium. If NaOMe/NaOH is used as the catalyst, acetic acid and acetic anhydride neutralize the catalyst thus retarding the transesterification reaction. Residual acetic anhydride additionally reacts with methanol to produce methyl acetate which even at low concentrations may adversely affect the ultimate level of conversion of PTMEA to PTMEG.

Particularly in the purification of diacetates of a copolymer of THF and 3-methyl tetrahydrofuran (3-MeTHF), higher acetic anhydride concentrations are encountered thus necessitating an efficient method of stripping these high boilers.

SUMMARY OF THE INVENTION

In view of the above mentioned problems associated with producing and recovering diesters of polytetramethylene ethers, the present invention provides in a process for producing diesters of polytetramethylene ethers by polymerizing THF optionally with one or more substituted THF or alkylene oxide comonomers in a reactor utilizing a solid acid catalyst and a carboxylic acid with carboxylic acid anhydride as molecular weight control agents, the improvement comprising the step of: utilizing superheated THF to strip unreacted carboxylic acid and carboxylic acid anhydride from the polytetramethylene ether diester polymerization product. The invention also provides in such a process the improvement comprising the steps of:

a) recovering from the reactor a product stream comprising a solution of polytetramethylene ethers, unreacted THF, and carboxylic acid with carboxylic acid anhydride;

b) flashing off the bulk of the unreacted THF from polytetramethylene ether diester solution at reduced pressure; and c) stripping any remaining THF, carboxylic acid and carboxylic acid by use of superheated THF.

In one embodiment of the invention the carboxylic acid is acetic acid and the carboxylic acid anhydride is acetic anhydride.

It is a primary object of the present invention to provide for efficient stripping of the high boiler from the product stream by using superheated THF thus avoiding problems associated alternative high temperature stripping. Fulfillment of this object and the presence and fulfillment of additional objects will become apparent upon complete reading of the specification and attached claims.

DESCRIPTION OF THE PREFERRED EMBODIMENTS

Figure 1:
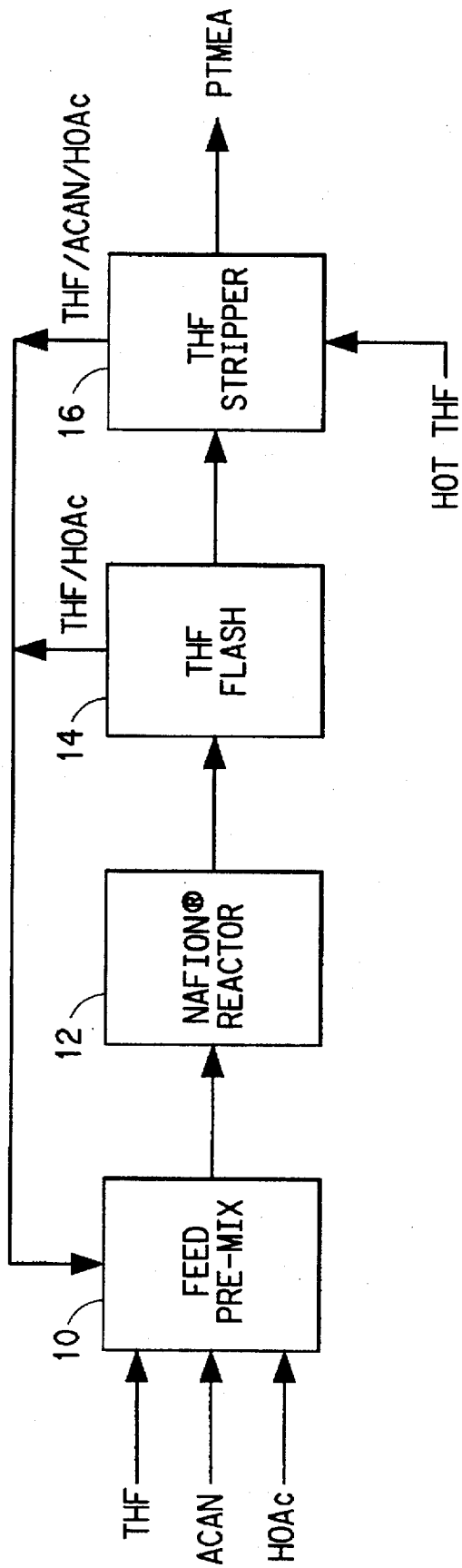
FIG. 1 is a schematic illustration of one particular embodiment of the overall improved method for manufacturing diacetate esters of polytetramethylene ethers according to the present invention.

The overall process for producing diesters of polytetramethylene ether compositions within which the present invention is found to be useful includes broadly any such polymerization employing a highly acid solid phase catalyst containing sulfonic acid groups capable of ring-opening polymerization of cyclic ethers and the like as generally known in the art. This includes by way of example but not by limitation, polymeric catalysts which contain sulfonic acid groups and optionally carboxylic acid groups. Particularly preferred solid acid catalyst are catalysts whose polymer chains are copolymers of tetrafluoroethylene or chlorotrifluoroethylene and a perfluoroalkyl vinyl ether containing sulfonic acid group precursors (again with or without carboxylic acid groups) as disclosed and taught in U.S. Pat. Nos. 4,163,115 and 5,118,869 and as supplied commercially by E. I. duPont de Nemours and Company under the tradename Nafion®. In presenting the following description and examples reference to the Nafion® catalyst will predominate since benefits and advantages of the improved process according to the instant invention are felt to be optimum for such highly reactive catalyst. However, other heterogeneous catalysts wherein the catalytic site involves the sulfonic acid group, as mentioned above, are felt to be equivalent to Nafion® for purposes of the present invention in that one or more of the advantages and/or benefits of the instant process will be derived or realized.

The diesters of polytetramethylene ether compositions being produced by the process within which the present invention is found to be useful are generally any such polyether as generally known in the art typically produced via an acid catalyzed ring opening polymerization reaction of a cyclic ether or mixture in the presence of a carboxylic acid and carboxylic acid anhydride wherein tetrahydrofuran is the major and/or dominant reactant; i.e., substantial THF being incorporated into the PTMEA product. More specifically, the polyether diesters are derived from the polymerization of THF with or without an alkyl substituted tetrahydrofuran comonomer (preferably for example 3-MeTHF) as well as the copolymerization of THF with or without 3-MeTHF and with an alkylene oxide or equivalent comonomer. As such, the following description and examples will predominantly refer to the polymerization of THF and/or THF with 3-MeTHF with the understand that the other comonomers may optionally be present. Also, for purposes of describing and claiming the present invention the term "polytetramethylene ethers" generically include both the homopolymerized THF polyether backbone as well as the corresponding copolymerized polymers.

The THF used in the process of the invention can be any of those commercially available. The THF will preferably have a water content of less than about 0.001%, by weight, and a peroxide content of less than 0.002%, by weight and optionally contains an oxidation inhibitor such as butylated hydroxytoluene to prevent formation of undesirable byproducts and color. If desired, from about 0.1 to about 50% by weight of the THF of the alkyl substituted tetrahydrofuran capable of copolymerizing with THF can be used in combination with the THF. A particularly preferred alkyl substituted THF is 3-MeTHF.

The solid acid catalyst useful in the present invention include broadly any such highly acid solid phase catalyst capable of ring-opening polymerization of cyclic ethers and the like as generally known in the art. This includes by way of example but not by limitation, polymeric catalysts which contain sulfonic acid groups and optionally with or without carboxylic acid groups, highly acidities natural clay (e.g., acidified montmorillonite) and/or zeolites, acidified zirconium/tin sulfate compounds and the like. Particularly preferred solid acid catalyst are catalysts whose polymer chains are copolymers of tetrafluoroethylene or chlorotrifluoroethylene and a perfluoroallcyl vinyl ether containing sulfonic acid group precursors (again with or without carboxylic acid groups) as disclosed and taught in U.S. Pat. Nos. 4,163,115 and 5,118,869 and as supplied commercially by E. I. duPont de Nemours and Company under the tradename Nafion®. In presenting the following description and examples reference to the Nafion® catalyst will predominate since benefits and advantages of the improved process according to the instant invention are felt to be optimum for such highly reactive catalyst. However, other heterogeneous catalysts as mentioned above are felt to be equivalent to Nation® for purposes of the present invention in that one or more of the advantages and/or benefits of the instant process will be derived or realized particularly as the catalyst reactivity approaches that of Nafion®.

The carboxylic acid anhydride used with the correspond carboxylic acid as molecular weight control agents according to the present invention are generally anhydrides of the carboxylic acids whose carboxylic acid moieties contain 1 to 36 carbon atoms. Especially preferred are those of 1 to 4 carbon atoms. Illustrative of such anhydrides are acetic anhydride, propionic anhydride and the like. The anhydride most preferred for use because of its efficiency is acetic anhydride and as such the following description and examples will specifically illustrate only the most preferred acetic acid and acetic anhydride combination. When maleic anhydride is employed the dimaleiate ester of PTMEG is convened to PTMEG by hydrogenation rather then transesterification/methanolysis (see for example, U.S. Pat. No. 5,130,470). The acetic anhydride and acetic acid used in the process of the invention can be any of those commercially available.

The role of the carboxylic acid with carboxylic acid anhydride is presently viewed to be generally consistent with the chemical mechanism suggested and taught in U.S. Pat. No. 4,167,115 wherein the carboxylic acid anhydride is an acylium ion precursor that in the presence of THF and solid acid catalyst initiate the reaction by forming an acyl oxonium ion with the THF reactant and thus producing concurrently a carboxylic acid molecule. This in turn leads to ring-opening polymerization (i.e., propagation via an oxonium ion mechanism) and ultimately to termination via reaction with the carboxylic acid. Although the present invention is not viewed as dependent on a single mechanistic interpretation, it is presently felt that the original initiation step for highly reactive solid acid catalysts such as Nafion® should be viewed as being reversible and the molecular weight ultimately being dependent on the ratio of initiation to termination (i.e., mechanistically/mathematically independent of rate of propagation). This discovery leads to a specific advantage of being able to control the molecular weight of the PTMEA product by varying the feed mixture to the reactor. More specifically, for a given catalyst loading, THF reactant concentration and operating conditions the molecular weight of the product is determined by the ratio of carboxylic acid to carboxylic acid anhydride. In fact, employing THF flashing and carboxylic acid stripping with recycle according to the present invention the amount or rate of carboxylic acid anhydride being fed to the reactor becomes the dominant operating parameter for determining molecular weight. Thus the instant process affords an easy and reliable method for controlling one of the more important commercially significant characteristics of the product.

Reaction Scheme and Reactor Design

A typical overall reaction scheme according to the instant invention is schematically represented in FIG. 1 wherein the specifically preferred embodiment of manufacturing polytetramethylene ether diacetate is accomplished by polymerizing Tetrahydrofuran (THF) using Nafion® as the catalyst in the presence of acetic acid (HOAc) and acetic anhydride (ACAN). As illustrated a mixture of THF, HOAc and ACAN stored in a pre-mix tank 10 is fed continuously to a single stage reactor system 12 containing a solid acid, Nafion®, which acts as a polymerization catalyst as described in U.S. Pat. No. 4,163,115, the teachings of which are herein incorporated by reference. It should be appreciated during continuous commercial operation it is envisioned that the pre-mix tank 10 can be eliminated or replaced with static mixers or the like, provided adequate quantitative control of the feed streams including various recycle streams is properly accounted for based on criteria as described and exemplified latter. As such, these alternatives and the like should be considered equivalent for purposes of this invention to the specifically illustrated embodiment employing a pre-mix tank 10.

During passage through the reactor, the THF ring is opened and a tetramethylene oxide polymer terminated by an acetate ester group is formed. The temperature of the single stage reactor 12 is controlled by setting the pressure such that the polymerization is taking place under THF evaporative conditions. Preferably the reactor will be equipped with low pressure (i.e., vacuum) reflux whereby the exothermic heat of reaction associated with polymerization of THF to PTMEA is withdrawn from the reactor 12 by overhead reflux at reduced pressure (not shown in drawing).

The reaction product is a solution of the diacetate ester of polytetramethylene ether glycol (PTMEA) and unreacted THF, acetic anhydride and acetic acid. The amount of THF reacted is a function of temperature, contact time, feed composition and catalyst concentration. The molecular weight of PTMEA is largely dependent on the feed composition, particularly the concentration of acetic anhydride in the feed. PTMEA molecular weight can be increased by decreasing the amount of acetic anhydride concentration in the reactor feed. Acetic acid is present in the feed primarily to prevent a runaway polymerization and secondarily to eliminate gelling of the reactor contents.

A typical conversion of about 35% is observed in the polymerization reactor which necessitates stripping of about 60–65% unconverted THF and acetic acid. As such, the reactor effluent is directed to a THF bulk flash unit 14 which is preferably operated under vacuum (typically about 400 to about 450 mm Hg) during flash of THF. In view of the relative amount of unreacted THF present this step requires heating of the polytetramethylene ether diester solution from the reactor to accomplish the desired bulk flashing of THF and acetic acid. The vapor phase from this bulk flash unit 14 (again in this specifically illustrated embodiment) is recycled back to the pre-mix tank 10 and then reintroduced into the reactor 12. The flashed PTMEA product stream is then delivered to the THF stripping unit 16. At this stage any remaining THF, ACAN and HOAc are removed by counter current stripping using hot THF at reduced pressure. The vapor phase from this superheated THF stripping step is also returned to the pre-mix tank as recycle. Alternatively these recycle streams can be directed to the stirred reactor 12 with or without commingling with each other or other feed streams.

Thus for purposes of the present invention, the polymerization reactor is intentionally and advantageously operated at reduced pressure (i.e., under vacuum) thus producing commercial grade of PTMEA under THF evaporative cooling conditions. In this manner the cooling of the reaction mixture is assisted by removal of evaporating THF and hence affording temperature control by setting the reactor pressure. Because the inherent limited conversion of THF results in considerable unreacted THF in the reactor effluent, the polymerization step is intentionally followed by a bulk THF flash under vacuum from about 200 to 600 mm Hg, preferably at pressure of about 410 mm Hg. Again because of the relative amount being flashed, considerable energy in the form of heat must be supplied to the reactor effluent. This heating step for purposes of this invention can by any such method generally known and practiced in the art and includes by way of example but not by of limitation methods based on warming and/or heating the effluent stream before or during the actual THF vapor phase flashing. The bulk flashed PTMEG product stream is then subjected to a superheated THF stripping step that can be typically performed in a counter current column operated under vacuum (e.g., 20 mm Hg at the top of the column) with descending molten PTMEG and simultaneous introduction of hot THF (e.g., 135° C. @ 90 psia) at the bottom of the column or the like. In this manner any residue THF and other high boilers including acetic acid and acetic anhydride are removed and recycled. Consequently the improved process according to the instant invention takes advantage of the extraordinary reactivity of solid acid catalyst such as Nafion® while simultaneously avoiding traditional product quality problems associated with excess heat of reaction and high temperature steam stripping of residual high boilers in the PTMEA product.

This polymerization may be run as either a batch or a continuous process. However, in order to take advantage of the high reactivity of catalysts such as Nafion®, and simultaneously manage the exothermic heat of reaction, it is felt that a continuously stirred tank reactor operated under evaporative reaction condition is much preferred. As such, a continuously stirred reactor having a nominal capacity of about 100 lbs of PTMEA per hour and based on the schematic flow diagram of FIG. 1 (except removal of heat of reaction was by use of a jacketed reactor rather than THF evaporative cooling) was constructed and employed in the following Example. A feed tank was used in this unit to premix the various ingredients used for the polymerization process which were (1) the recycle THF stream containing THF, acetic acid and small amounts of acetic anhydride, returned from the flash unit and superheated THF stripping unit installed downstream of the polymerization reactor; (2) fresh THF at a rate primarily based on the production rate of polymer (i.e., about 100 lbs./hr.); and (3) fresh acetic anhydride at a flow rate determined by the desired molecular weight of polymer. Acetic anhydride was largely consumed during the polymerization reaction and must be continually added to the pre-mix, unlike the acetic acid, which was not consumed in the reaction and was returned in the recycle stream with the THF. As previously mentioned, the generation of the recycle stream was due to the limited conversion of THF to PTMEA in the polymerization reactor.

The pre-mixed stream comprising THF, acetic anhydride and acetic acid at the desired composition was pumped continuously to a glass-lined stirred tank reactor which was designed for a hold-up time of about 30 to about 60 minutes. A lined reactor was necessary to eliminate the potential for the catalyst to be deactivated by the reaction of the catalyst's sulfonic acid functionality with a metal. Alternatively, this lining may be Teflon® or a comparable material, but was preferably glass. The reactor contains between about 2% to 40% catalyst, preferably between about 5% to 15%, and most preferably 10% by weight relative to the weight of the feed and the catalyst was continuously suspended by an agitator.

THF/ACAN/HOAc stripping

One of the key steps in the purification of PTMEA is the removal of acetic acid and unreacted acetic anhydride. Because both of these components are high boilers in comparison to THF, removal of acetic anhydride and acetic acid has remained a challenge particularly in large scale operations. In laboratory operation, these components can be removed by sustained drying with nitrogen purge but such an operation is not feasible on a large scale. In addition, purifying PTMEA so that the residual acetic acid and acetic anhydride concentrations are less than 100 ppm requires temperatures in excess of 140° C. Unfortunately, PTMEA tends to discolor and to some extent degrade at these temperatures when exposed for prolonged period of time.

One aspect of the present invention relates to the removal of acetic acid and acetic anhydride from PTMEA by the use of a conventional stripping column in which vaporized THF is used to strip the acetic acid and acetic anhydride from the PTMEA reaction product. Water can not be used in this particular application but THF is ideal for PTMEA, purification.

The reaction mass from the polymerization reactor is first heated from about 90° C. to about 130° C. under a back pressure of about 120 psig and then injected into a vessel at under a vacuum of between about 200 to 600 mm Hg. In this step most of the THF/acetic anhydride/acetic acid flashes off and is then condensed and recycled. The PTMEA and remaining THF/acetic anhydride/acetic acid then passes to a THF stripper wherein THF vapor is used to strip the residual acetic acid and acetic anhydride. The THF stripper is a column, preferably a packed column with between 3 to 10 theoretical stages, preferably 5. Superheated THF vapor is used to strip the residual acetic acid and acetic anhydride from the polymer solution. THF is heated to a temperature of about 135° C. The THF vapor is flashed into the stripper column which is operated at about 20 mm Hg. The stripped THF/acetic acid/acetic anhydride is condensed and recycled.

Example

A polymer solution containing 33.4% PTMEA 62.9% THF, 3.0%, acetic acid, and 0.7% acetic anhydride was heated to about 120° C. and fed to a THF separator operating at 450 mm Hg. The overheads of this separator contained 94.9% THF, 4.1% acetic acid, and 1.0% acetic anhydride, whereas the remaining polymer solution contained 96.6% PTMEA, 2.3% THF, 1.0% acetic acid, and 0.1% acetic anhydride. This polymer solution was fed to the upper tray of a column packed with stainless steel structured packing having 10 stages and operated at 20 mm Hg. THF heated to 135° C. at 75 psig was introduced at the bottom of the column. The superheated THF stripped the remaining acetic acid/acetic anhydride from the polymer solution, giving column overheads containing 94.7% THF, 4.7% acetic acid, and 0.6% acetic anhydride, whereas the remaining polymer solution contained 99.8% PTMEA, 0.2% THF, and less than 100 ppm of acetic acid and acetic anhydride.

The product color when lined out was less than 10 APHA units which is an indication of the effectiveness with which the residual acetic acid/acetic anhydride was removed without affecting PTMEA quality. The ability to produce polymer with low color and low acetic acid concentration is a major improvement on the prior art. In particular, excellent color control of product even in the presence of unsaturated impurities conventionally considered harmful to THF polymerization as they tend to discolor product is confirmed.

Having thus descried and exemplified the invention with a certain degree of particularity, it should be appreciated that the following claims are not to be so limited but are to be afforded a scope commensurate with the wording of each element of the claim and equivalents thereof.

We claim:

1. In a process for producing diesters of polytetramethylene ethers by polymerizing THF optionally with one or more substituted THF or alkylene oxide comonomers in a reactor utilizing a solid acid catalyst and a carboxylic acid with carboxylic acid anhydride as molecular weight control agents, wherein the improvement comprises the steps of:

a) recovering from said reactor a product stream comprising a solution of polytetramethylene ethers, unreacted THF, and carboxylic acid with carboxylic acid anhydride;

b) flashing off the bulk of said unreacted THF from polytetramethylene ether diester solution at reduced pressure; and c) stripping any remaining THF, carboxylic acid and carboxylic acid anhydride by use of superheated THF.

2. A process of claim 1 wherein said carboxylic acid is acetic acid and said carboxylic acid anhydride is acetic anhydride.

3. In a process for producing diesters of polytetramethylene ethers by polymerizing THF optionally with one or more substituted THF or alkylene oxide comonomer reactant in a reactor utilizing a solid acid catalyst and a carboxylic acid with carboxylic acid anhydride as molecular weight control agents, wherein the improvement comprises the step of: utilizing superheated THF to strip unreacted carboxylic acid and carboxylic acid anhydride from the polytetramethylene ether diester polymerization product.

4. A process of claim 3 wherein said carboxylic acid is acetic acid and said carboxylic acid anhydride is acetic anhydride.

* * * * *